March 24, 1970     W. WAHLI ET AL     3,501,977

CARDIOID CAM RESETTING DEVICE

Filed May 20, 1968

Inventors:
Werner Wahli
Ernst Hofer
By Michael S. Striker
Attorney

United States Patent Office

3,501,977
Patented Mar. 24, 1970

3,501,977
CARDIOID CAM RESETTING DEVICE
Werner Wahli, Bern-Buempliz, and Ernst Hofer, Spiegel, near Bern, Switzerland, assignors to W. Wahli A.G., Bern-Buempliz, Bern, Switzerland, a corporation of Switzerland
Filed May 20, 1968, Ser. No. 730,392
Int. Cl. F16h 53/00; G06c 15/42
U.S. Cl. 74—567                                        9 Claims

ABSTRACT OF THE DISCLOSURE

A zero resetting device has a cardioid cam rotatable about a spindle and a zero reset element operated by pivoting about a spindle parallel to the cam spindle. The zero reset element is formed by two members each having feeler projections for cooperation with the periphery of the cardioid cam. The second of the two members is resiliently and displaceably coupled to the first member.

---

The invention relates to a resetting device of the cardioid cam type, comprising a cardioid cam rotatable about a spindle and a resetting element arranged to be operated by pivoting about a spindle parallel to the cam spindle, and formed by two members comprising feeler projections for cooperation as required with the periphery of the cardioid cam, of which members the second is displaceably arranged relative to the first and is resiliently coupled to the same.

Known resetting or return devices of this nature, e.g., on counting mechanisms which are reset automatically, possess a resetting member consisting of a first lever with auxiliary feeler projection and a second lever with two spaced-apart feeler projections for establishing the reset position of the cardioid cam by simultaneous contact thereof with the periphery of the cardioid cam. The two levers are separately pivotable about a shared spindle as resiliently interconnected, and the primary actuation of the first lever is intended by means of the resilient coupling, to bring one of the two feeler projections of the second lever into contact with the cam periphery. If the automatic resetting device comes into action when the cardioid cam is situated in the dead center position, i.e., when this feeler projection impinges precisely on the tip of the cam periphery, the auxiliary feeler projection reaches the cam periphery at a point staggered relative to the aforesaid projection and initiates the resetting motion of the cardioid cam.

It was found however that under stringent requirements applicable to this resetting device, say at high speeds of revolution of the cardioid cam, and desirable reliability of absolute nature in the order of magnitude of 1 million resetting actions, the wear incurred by the feeler projections is so great despite incorporation of glass-hard surfaces, that breakdowns occur prematurely.

It has been discovered by thorough investigations and tests, that the degree of reliability required may be attained if each of the two members of the resetting element comprises but one feeler projection, which projections determine the resetting position of the cardioid cam by simultaneous contact with its periphery, and of which projections, the feeler projection impinging on the tip of the periphery of the cardioid cam in the dead center position of the latter is situated on the second member, whereof the mounting point on the first member is excentrically situated relative to the pivot spindle of the resetting element.

An example of embodiment of the invention is described in detail in the following with reference to the accompanying drawings.

Figure 1:
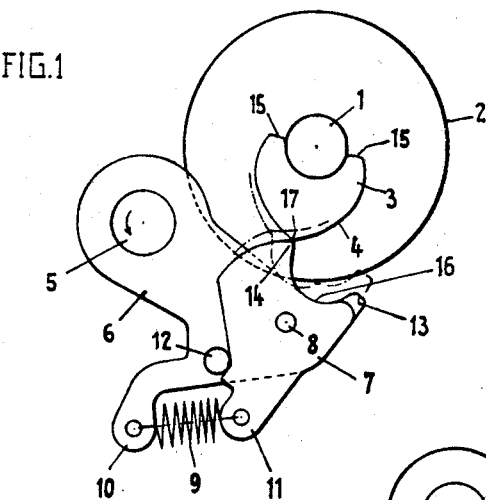
Figure 4:
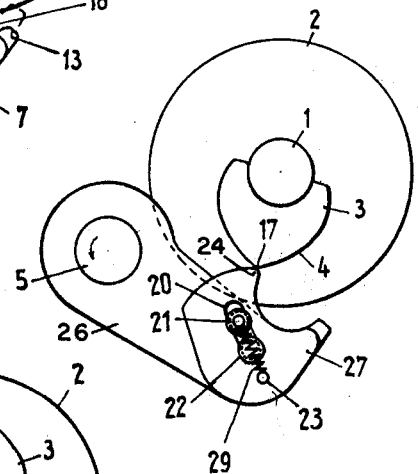
Figure 2:
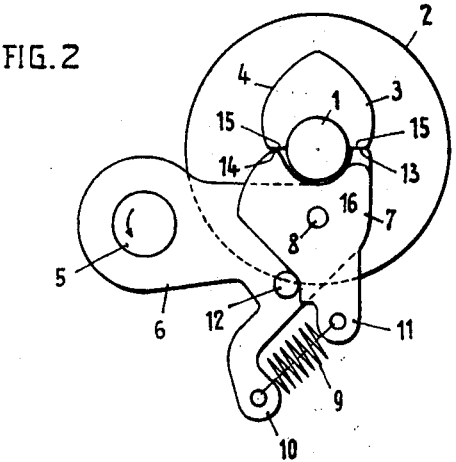
Figure 3:
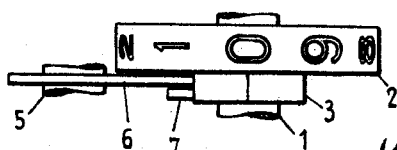

FIG. 1 is a view of a cardioid cam resetting device in axial direction, in the operative condition, with the cardioid cam situated in the dead center position, FIG. 2 shows the resetting device of FIG. 1 in the reset state, FIG. 3 is a view from above in FIG. 2, and FIG. 4 is an axial view similar to FIG. 1, of a modification of the embodiment of the invention.

Of a counting mechanism there is shown only the counting spindle 1 with a numbered roller 2 arranged thereon, on which is secured a resetting cardioid cam 3 for resetting the same to zero. To exert the resetting thrust on the periphery 4 of the cardioid cam 3, a resetting element comprising two levers 6 and 7 is arranged in the plane of the cam 3 on a pivot spindle 5 axially parallel to the counter spindle 1, which may be pivoted by means of this pivot spindle to cause resetting of the numbered roller 2 to zero by means of the cardioid cam 3. To this end, the first lever 6 is secured on the pivot spindle 5, and the second lever 7 is rotatably arranged on a pivot pin 8 parallel to the pivot spindle 5 and is coupled in resiliently yielding manner with the first lever 6 by means of a tension spring 9 whereof the two extremities act on corresponding projections 10 and 11 of these two levers and which tends to keep the lever 7 in contact with an abutment pin 12 arranged in the lever 6.

For cooperation with the cam periphery 4, the two levers 6 and 7 each possess a feeler projection 13 and 14, respectively, spaced at such distance from each other that both feeler projections determine the zero position of the numbered roller 2 by simultaneous contact with the rim 15 of the cam periphery. By contrast to the feeler projection 13 of the lever 6, the feeler projection 14 of the lever 7 has a pointed shape, whose tip is slightly rounded off however. Between the two feeler projections is incorporated a recess 16 which is apt to receive half the periphery of the counter spindle 1 without contact with the levers 6 and 7.

On actuation of the resetting device described, the pivot spindle 5 in FIG. 1 is turned in the direction of the arrow, the levers 6 and 7 thereby being displaced towards the cam periphery 4 and the feeler projection 14 of the lever 7 coming into contact with the same. The point of contact of this feeler projection with the cam periphery is normally situated on its cardioid-shaped curve, so that the cam 3 with the numbered roller 2 is turned back by lever thrust to the zero position according to FIGS. 2 and 3.

If however, the feeler projection 14 of the lever 7 impinges precisely on the tip of the periphery 4 (FIG. 1) when the cardioid cam 3 is in the dead-center position, the lever thrust initially acts radially to the spindle 1 and cannot set the cam in rotation. The lever 6 may nevertheless be entrained in the direction of the arrow by means of the pivot spindle 5, with the consequence that the lever 7 is turned relative to the lever 6 around the pivot pin 8 and the spring 9 is stretched, the rounded-off tip of the feeler projection 14 concomitantly rolling along the cardioid cam tip 17 and the lever thrust which is increased at the same time owing to stretching of the spring 9, veering from the radial direction to the spindle 1 (position shown dash-dotted in FIG. 1) and thereby causing the cardioid cam to rotate. The spring 9 then gradually draws the lever 7 back to the abutment pin 12, so that the levers 6 and 7 again assume their normal relative position shown in FIG. 2, when the cam 3 reaches its neutral or zero position.

The modification of the resetting device as shown in FIG. 4 differs from the embodiment described heretofore in that the second lever 7 is replaced by a slide 27 having a rectilinear slot 20 which is traversed by two pins 21 and 22 mounted in the first lever 26 for guiding the slide 27 in the plane of motion of this lever in a direction which is substantially transversal to the plane containing the axis of the spindle 1 of the roller 2 and the axis of the spindle 5 of the lever 26. A tension spring 29 is mounted with its one end to a pin 23 on the slide 27 and with its other end to the pin 21 on the lever 26 and tends resiliently to pull the slide unto the abutment pin 22. The resetting operation with this device is quite normal as long as the feeler projection 24 of the slide 27 comes into contact with the curved flanks 4 of the cardioid cam 3 of the roller 2. If however, the feeler projection 24 impinges precisely on the tip 17 of the cam periphery as shown in FIG. 4, because the cam is just in the dead center position, the resetting thrust of the lever 26 initially acts radially to the spindle 1 of the roller. By further turning the lever 26 in the direction of the arrow by means of the spindle 5, there occurs a relative displacement between the lever 26 and the slides 27, by which the spring 29 is stretched and increases the thrust upon cam 3. Thereby the thrust of the feeler projection 24 upon the cam tip 17 migrates from the radial direction to the spindle 1 and causes the cam to give way. The spring 29 then gradually draws the slide 27 back to the abutment pin 22.

The slot in the slide may be slightly curved so as to assist the alteration of direction of the resetting thrust.

What we claim is:

1. Cardioid cam resetting device, comprising a cardioid cam rotatable about a spindle and a resetting element arranged for operation by pivoting about a spindle parallel to the axis of the cam, formed by two members with feeler projections for cooperation as required with the periphery of the cardioid cam, of which members the second is arranged to be displaceable relative to the first and being resiliently coupled with the same, characterised in that the two members of the resetting element each comprises but one feeler projection, which projections determine the resetting position of the cardioid cam by simultaneous contact with its periphery, and of which projections, the feeler projection impinging on the tip of the periphery of the cardioid cam in the dead-center position of the latter being arranged on the second member whose mounting point is situated on the first member eccentrically to the pivot spindle of the resetting element.

2. Resetting device according to claim 1, wherein the feeler projection of the second member has a rounded-off feeler tip.

3. A cardioid resetting device, comprising a rotary first spindle; a cardioid cam secured to said first spindle for rotation therewith to and from a dead-center position, and having a cam periphery with a pointed extremity; and actuating means associated with said cam, said actuating means including a second rotary spindle paralleling said first spindle, a pair of members one of which is secured to said second spindle for rotation therewith and the other of which is secured to said one member for movement relative thereto and eccentrically with reference to said second spindle, a first projection on said first member for engagement with said cam periphery, and a second projection on said second member and operative for engagement with said extremity in response to turning movement of said second spindle and with said cam located in said dead-center position thereof.

4. Resetting device according to claim 3, wherein the second member is rotatably arranged on the first member about a pivot pin parallel to the second spindle.

5. Resetting device according to claim 3 wherein the second member is displaceably guided on the first member in the plane of motion of the latter.

6. Resetting device according to claim 3, said second member being movable between a first position relative to said first member, and a second position relative to said first member which latter position it assumes in response to rotation of said second spindle; and further comprising biasing means associated with said first and second members and operative for permanently urging the latter to said first position relative to the former.

7. Resetting device according to claim 3; and further comprising a number wheel provided on said first spindle for rotation therewith from a zero setting position to another position, said resetting device being operative for resetting said number wheel to said zero setting position.

8. Resetting device according to claim 5, said first member comprising guide projection means projecting therefrom in axial direction of said second spindle, and said second member being provided with an elongated slot into which said guide projection means extends with clearance relative to the elongation of said slot.

9. Resetting device according to claim 8, wherein said slot is rectilinear.

References Cited

UNITED STATES PATENTS 3,248,051 4/1966 Kelch.
3,368,750 2/1968 Bottling.

FRED C. MATTERN, Jr., Primary Examiner

F. D. SHOEMAKER, Assistant Examiner

U.S. Cl. X.R.

235—144